United States Patent
Scarbrough et al.

(10) Patent No.: US 6,979,487 B2
(45) Date of Patent: Dec. 27, 2005

(54) GLOSSY PRINTED ARTICLE AND METHOD OF MANUFACTURING SAME

(75) Inventors: Joel Scott Scarbrough, Burlington, WI (US); Daniel C. Faul, West Bend, WI (US)

(73) Assignee: Serigraph Inc., West Bend, WI (US)

( * ) Notice: Subject to any disclaimer, the term of this patent is extended or adjusted under 35 U.S.C. 154(b) by 103 days.

(21) Appl. No.: 10/239,691

(22) PCT Filed: Mar. 26, 2001

(86) PCT No.: PCT/US01/09767

§ 371 (c)(1),
(2), (4) Date: Mar. 31, 2003

(87) PCT Pub. No.: WO02/076721

PCT Pub. Date: Oct. 3, 2002

(65) Prior Publication Data

US 2003/0211295 A1    Nov. 13, 2003

(51) Int. Cl.[7] .............................................. B32B 3/00
(52) U.S. Cl. ................................ 428/195.1; 428/411.1; 101/211
(58) Field of Search ............................. 428/195.1, 40.9, 428/30, 40.1, 41.7, 42.1, 411.1; 283/91; 101/211

(56) References Cited

U.S. PATENT DOCUMENTS

| | | | |
|---|---|---|---|
| 4,913,504 A | 4/1990 | Gallagher | 359/1 |
| 5,106,126 A | 4/1992 | Longobardi et al. | 283/94 |
| 5,270,101 A | 12/1993 | Helicher | 428/209 |
| 5,456,967 A | 10/1995 | Nezu | 428/141 |
| 5,492,370 A | 2/1996 | Chatwin et al. | 283/110 |
| 5,741,578 A | 4/1998 | Sax | 428/212 |
| 5,742,411 A | 4/1998 | Walters | 359/2 |
| 5,744,219 A | 4/1998 | Tahara | 428/32.79 |
| 5,762,379 A * | 6/1998 | Salmon et al. | 283/91 |
| 5,851,032 A | 12/1998 | Green | 283/72 |
| 6,042,888 A | 3/2000 | Sismanis et al. | 427/256 |
| 6,113,149 A | 9/2000 | Dukatz | 283/91 |
| 6,132,822 A | 10/2000 | Overcash et al. | 428/34.2 |
| 6,145,565 A | 11/2000 | Fromson et al. | 156/580 |
| 6,170,881 B1 * | 1/2001 | Salmon et al. | 283/91 |
| 6,180,228 B1 | 1/2001 | Mueller et al. | 428/354 |
| 6,181,446 B1 | 1/2001 | Cox et al. | 359/3 |
| 6,187,389 B1 | 2/2001 | Overcash et al. | 427/488 |
| 2003/0205895 A1 * | 11/2003 | Scarbrough et al. | 283/91 |
| 2004/0140665 A1 * | 7/2004 | Scarbrough et al. | 283/95 |

FOREIGN PATENT DOCUMENTS

WO    WO 98/33660    8/1998

* cited by examiner

*Primary Examiner*—Rena Dye
*Assistant Examiner*—Carrie S. Thompson
(74) *Attorney, Agent, or Firm*—Godfrey & Kahn, S.C.

(57) ABSTRACT

An improved printed article and a method of making same. The article including a substrate having a top surface and a bottom surface, with a reflective layer printed on the top surface of the substrate, a graphic design layer printed on the reflective layer, a textured pattern of transparent ink printed over the graphic design and reflective layer, and a glossy layer of transparent ink printed over the textured pattern and reflective layer. The glossy layer is printed over the entire surface of the substrate. The graphic image is printed through a four-color printing process over portions of the reflective layer. The textured pattern includes a plurality of light bending convex lines of transparent ink printed on and around the graphic image and reflective layers. The lines produce a reflective glossy textured surface on the printed article creating the illusion of depth and three-dimensionality.

20 Claims, 11 Drawing Sheets

GLOSSY PRINTED ARTICLE AND METHOD OF MANUFACTURING SAME

CROSS-REFERENCE TO RELATED APPLICATIONS

This application claims priority to PCT Patent Application No. PCT/US01/09767, filed Mar. 27, 2001.

FIELD OF THE INVENTION

The present invention relates generally to a printed article, and more particularly to a glossy printed article having a graphic design such as a trading card, greeting card, sign, poster, label, decal, book cover, decorative panel, name plate, a visual display or the like having a glossy image with a textured pattern printed thereon by a printing method that makes the images come alive with depth, texture and three-dimensionality.

BACKGROUND OF THE INVENTION

In order to attract the attention of consumers, many products are being manufactured with images that provide a unique and sensational visual presentation. To meet this demand, a variety of printing techniques have been developed to produce aesthetically pleasing visual effects, such as the appearance of depth and three-dimensionality. Various methods are known in the prior art that produce three-dimensional images on two-dimensional media.

One method involves printing two offset images in different colors on an opaque or transparent sheet, and viewing the images using special glasses having right and left lenses which correspond to the different image colors respectively. Holographic technology can also be used to produce am image on a flat sheet which appears three-dimensional when illuminated and viewed at the proper angles.

However, these methods have not been commercially popular for various reasons. The offset image method is undesirable in that special glasses are required to view the image. Holograms are difficult and expensive to produce. Therefore, processes have been developed to produce the illusion of three-dimensional images on two-dimensional media. One such process is conventional embossing, which forms a raised pattern on a substrate by physically deforming part of the substrate upwardly. However, embossing suffers from the drawback that an expensive press is necessary to perform the operation, and a die bearing the desired embossed pattern must be made for each application. Further, the materials that can be used for embossing are limited because of the deforming nature of the embossing process.

Therefore, a need exists for a printing method and printed article that offers the visual impact of embossing without the cost. The assignee of the present invention has developed a number of printing processes for printing a variety of visually stimulating vibrant images creating the illusion of depth, texture and three-dimensionality as disclosed in U.S. Pat. Nos. 5,762,379; 6,113,149; and 6,170,881; the disclosures of which are incorporated herein by reference. The present invention provides an improved printing method for printing vibrant glossy images on a printed article having the illusion of depth, texture and three-dimensionality.

SUMMARY OF THE INVENTION

Therefore, it is an object of the present invention to provide a printed article and printing method that overcomes the drawbacks of the prior art. It is another object of the present invention to provide a printing method for printing glossy images on a printed article creating the illusion of depth, texture and three-dimensionality. It is a further object of the invention to provide a glossy printed article with a textured pattern printed over a graphic image printed on a reflective surface by a four-color offset printing process. It is yet another object of the invention to provide a printing process for printing images on a printed article creating visual impressions which change as the viewing angle of the printed article is changed.

The present invention is an improvement of U.S. Pat. No. 5,762,379, assigned to the assignee of the present invention, and incorporated herein by reference. The present invention provides a much less expensive method of producing a printed article having a glossy appearance with a graphic design creating the illusion of an embossed article. The printed article of the present invention creates the illusion of an embossed article with a textured pattern printed over and/or around a graphic design or image that is printed on a reflective surface with a uniform transparent glossy layer printed over the textured pattern.

The present invention includes a substrate having a top surface and a bottom surface. The substrate may be formed of any suitable type of printable material. A reflective layer is printed over the surface of the substrate. Alternatively, a reflective ink or foil may be deposited or laminated on the top surface of the substrate. A graphic design or image is printed over the reflective layer. The image may cover the entire portion of the reflective layer or only selected portions thereof. The image may comprise a plurality of ink layers in order to produce the desired graphic design. The graphic image is preferably applied to the reflective layer through a four-color offset printing process where a base layer is printed and a four-color image is printed over the base layer. Printed on top of the graphic image is a plurality of light bending textured lines to produce the desired visual effect of depth and three-dimensionality. These lines, convex in cross section, produce a reflective textured pattern on the surface of the printed article. A glossy layer of transparent ink is printed over the entire surface of the textured lines and graphic image. The inks used in the present invention are preferably curable in response to the application of ultraviolet light.

The graphic image may be printed with opaque ink, semi-transparent ink, translucent ink, or any combination thereof. These inks are preferably curable in response to ultraviolet (UV) light. Other methods of forming the graphic image include silk screening, lithography, flexography, gravure or other known printing methods.

The textured pattern includes raised portions for bending and reflecting light incident to the printed article. The textured lines are formed from a transparent ink printed on the image by a printing process such as silk screening, lithography, flexography, coating or other known printing method. The printed lines create lenses that have a convex curvature to refract the incident light.

Various other features, objects, and advantages of the invention will be made apparent to those skilled in the art from the accompanying drawings and detailed description thereof.

DETAILED DESCRIPTION OF THE INVENTION

Figure 1:
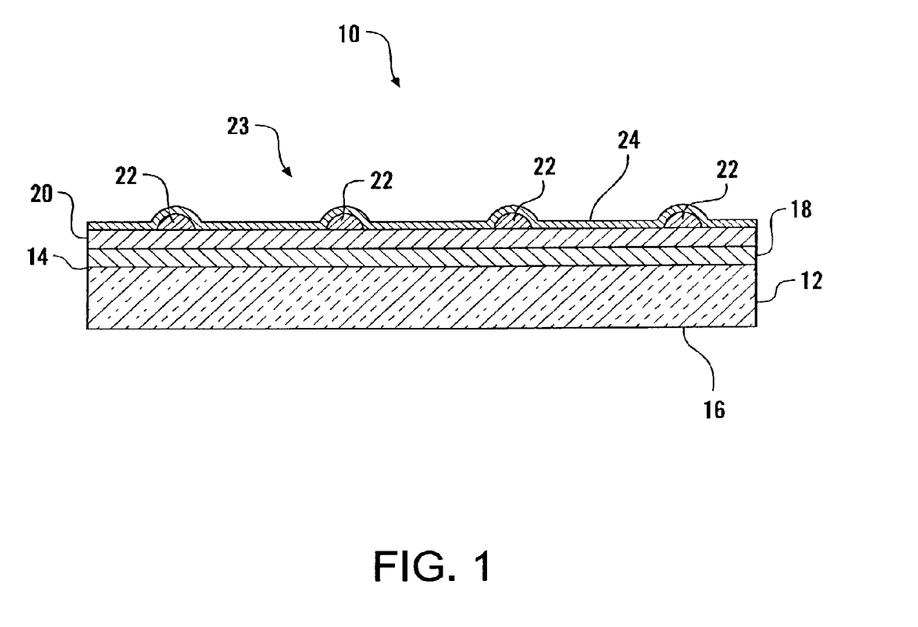
FIG. 1 is an enlarged cross-sectional view of a first embodiment of a printed article produced in accordance with the present invention.

Referring now to the drawings, FIG. 1 illustrates an enlarged cross sectional view of a first embodiment of a printed article produced in accordance with the present invention. The printed article 10 includes a substrate 12 having a top surface 14 and a bottom surface 16. The substrate 12 can be formed of paper, cardboard, plastic, acrylic, glass, metal or any other suitable printable material.

A reflective or ink layer 18 is printed over all or a portion of the top surface 14 of the substrate 12. The reflective layer 18 is preferably formed of reflective ink which is printed onto the substrate 12. The reflective layer 18 can be clear or have any color. The reflective layer 18 can be opaque, transparent, semi-transparent or translucent. The reflective layer 18 gives the printed article a shiny or glossy metallic appearance. Alternatively, the reflective layer 18 can be formed of a chrome film, diffraction film, metallic foil, holographic foil, roll leafing or any metalized material having a shiny surface.

Figure 6:
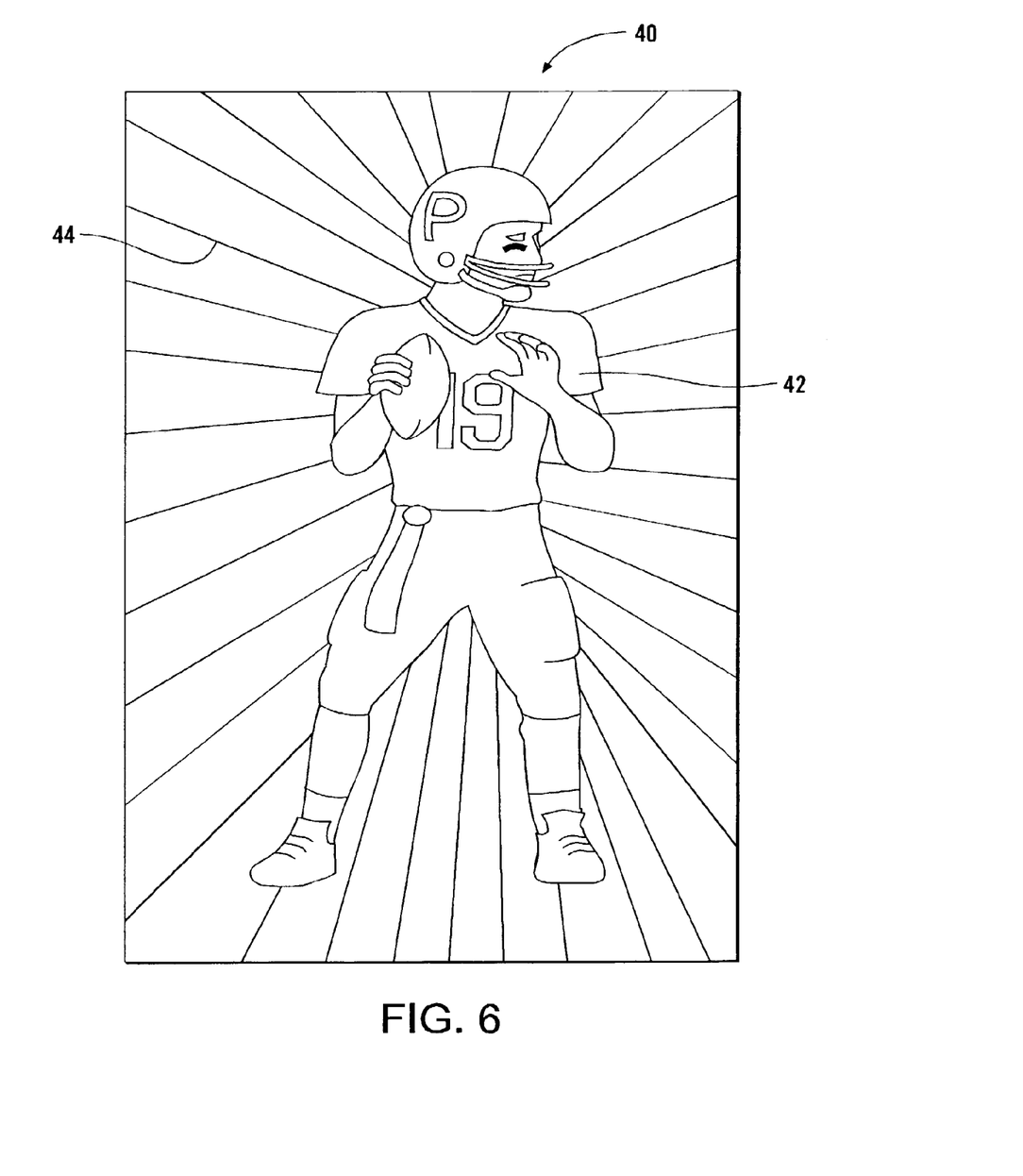
FIG. 6 is a top plan view of a trading card having an image produced in accordance with the present invention.

A graphic design or image 20 is printed over all or a portion of the reflective layer 18. The image 20 can have any desired form, for example, a football player on a sports trading card as shown in FIG. 6, or any other image. The graphic design or image 20 may comprise a plurality of ink layers in order to provide the desired design. A preferred method of forming the graphic image 20 is through a four-color offset printing process where a base layer is printed and a four-color image is printed over the base layer. The graphic image 20 may be printed with opaque ink, semi-transparent ink, translucent ink, or any combination thereof. These inks are preferably curable in response to ultraviolet (UV) light. Other methods of forming the graphic image 20 include silk screening, lithography, flexography, gravure or other known printing methods.

A textured pattern 23 is printed over and/or around the graphic design or image 20. The textured pattern includes a plurality of parallel convex rounded ridges or lines 22 of transparent ink printed over and/or around the graphic design or image 20. In the preferred embodiment, the height and thickness of the lines is approximately 0.5 mils to 2 mils. However, the thickness, height and spacing of the lines may vary depending upon the particular application and desired visual effect. The textured pattern 23 can be formed over the entire surface of the image 20 or over only a portion thereof. The textured pattern 23 of lines 22 is preferably formed from a transparent ink, such as Nasdar 3527 or the like, printed on top of the graphic design or image 20 by a printing method such as silk screening, lithography, flexography, offset printing, gravure, coating or other known printing method. The transparent ink has rheological properties such that when it is applied, it flows into a semi-cylindrical or other type of convex shape when viewed in cross-section. This transparent ink is also preferably a UV curable ink. The transparent ink may also include flakes of glitter, pearls, or other materials to produce a "glittery" effect.

The textured pattern 23 gives the appearance of a raised or embossed effect, which simulates depth and three-dimensionality. The semi-cylindrically shaped raised ridges or lines 22 bend and reflect light incident on the printed article 10 producing the visual illusion of depth, texture and three-dimensionality in the printed article as it is viewed from different angles. Light incident on the printed article 10 is reflected off the reflective layer 18 back through the graphic design or image 20 and the textured pattern 23 to create a unique visual effect.

A transparent glossy layer 24 is printed over the textured pattern 23 of lines 22 and the graphic design or image 20. The transparent glossy layer 24 must be thin enough not to diminish the glossy and reflective properties of the reflective layer 18 and the lines 22 of the textured pattern 23. The glossy layer 24 is preferably formed of substantially transparent ink. The transparent glossy ink layer 24 provides a uniform glossy appearance of the textured pattern and gives the printed article a shiny or glossy appearance.

Light incident on the printed article 10 from above is reflected off the reflective layer back through the graphic design or image, the textured pattern and the glossy layer, such that the printed article exhibits depth, texture and three-dimensionality.

Figure 1A:
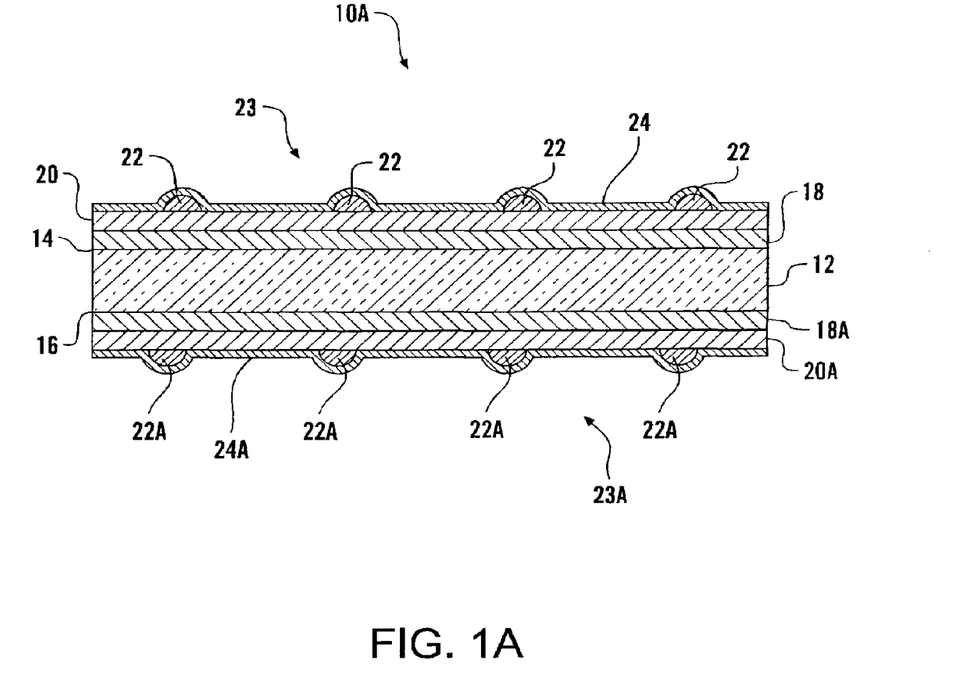
FIG. 1A is an enlarged cross-sectional view of the printed article of FIG. 1 with printing on both the top and bottom surfaces of the printed article.

FIG. 1A illustrates the printed article 10 of FIG. 1 with printing on both the top 14 and bottom 16 surfaces of the substrate 12. The printed article 10A of FIG. 1A includes a second reflective layer 18A printed on the bottom surface 16 of the substrate 12, a second graphic design or image 20A printed over and/or around the second reflective layer 18A, a second textured pattern 23A of lines 22A printed on the second graphic design or image 20A, and a second glossy layer of transparent ink 24A printed on the second textured pattern 23A and the second graphic design or image 20A.

Figure 2:
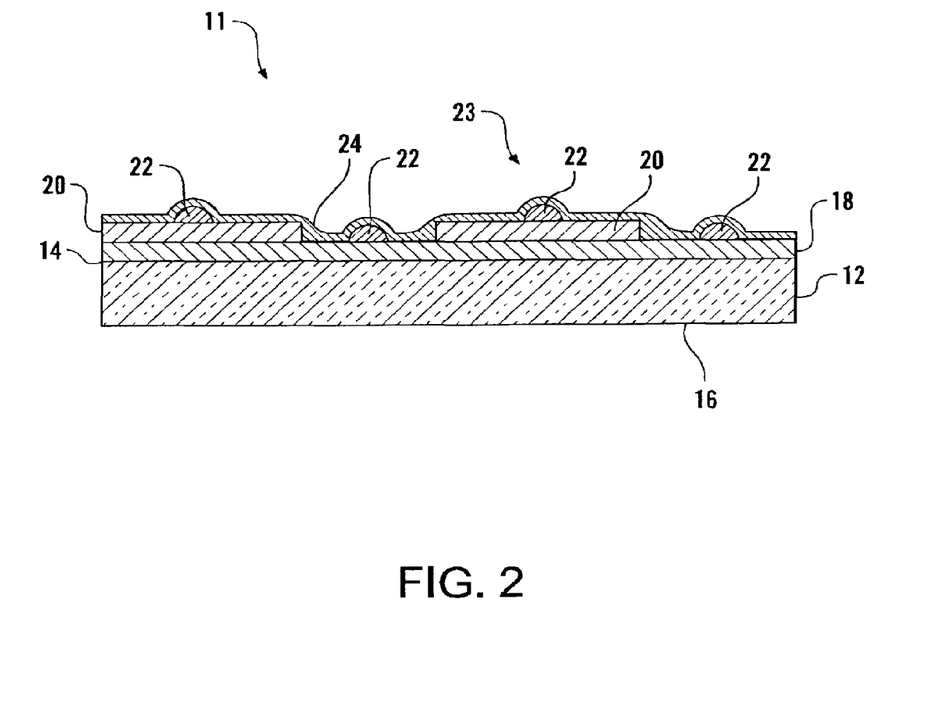
FIG. 2 is an enlarged cross-sectional view illustrating a modification of the embodiment shown in FIG. 1.
Figure 2A:
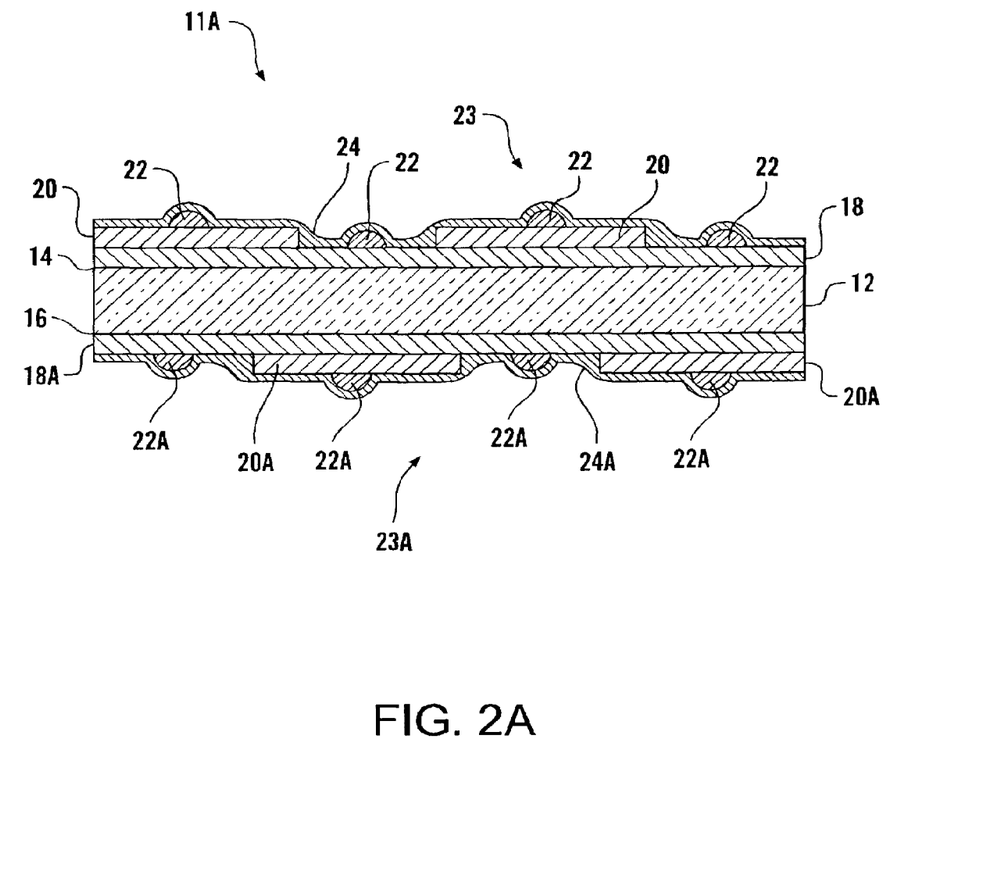
FIG. 2A is an enlarged cross-sectional view of the printed article of FIG. 2 with printing on both the top and bottom surfaces of the printed article.
Figure 3:
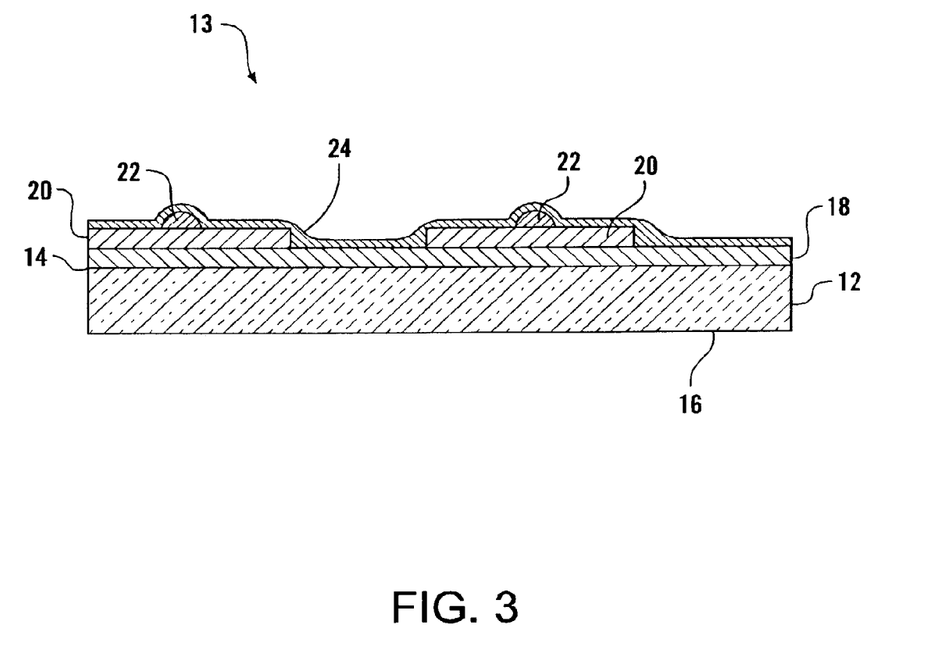
FIG. 3 is an enlarged cross-sectional view illustrating another modification of the embodiment shown in FIG. 1.
Figure 3A:
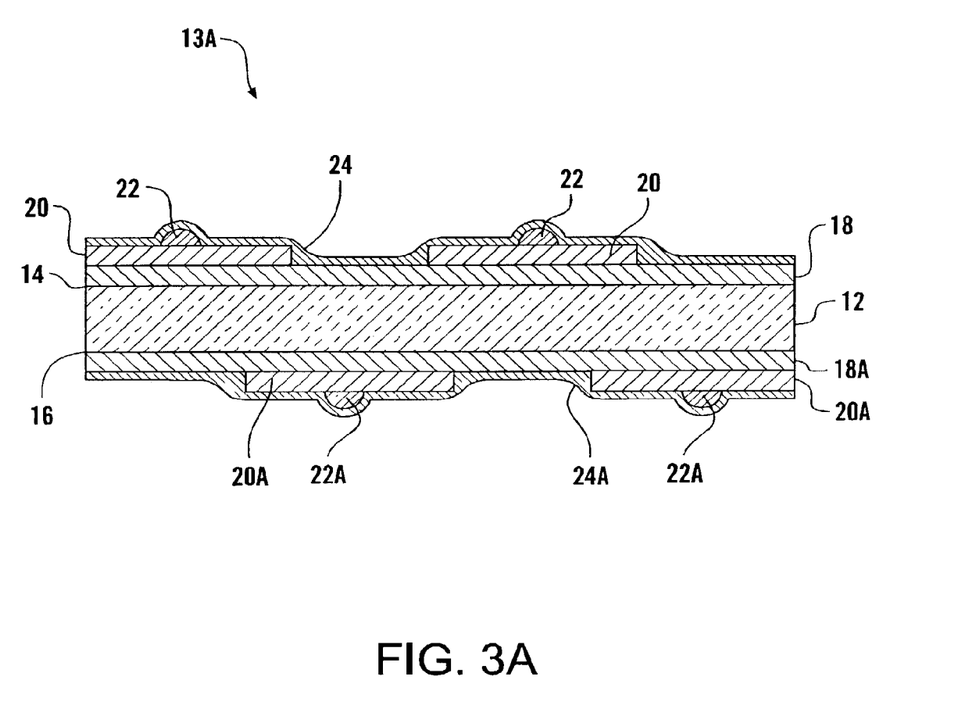
FIG. 3A is an enlarged cross-sectional view of the printed article of FIG. 3 with printing on both the top and bottom surfaces of the printed article.
Figure 4:
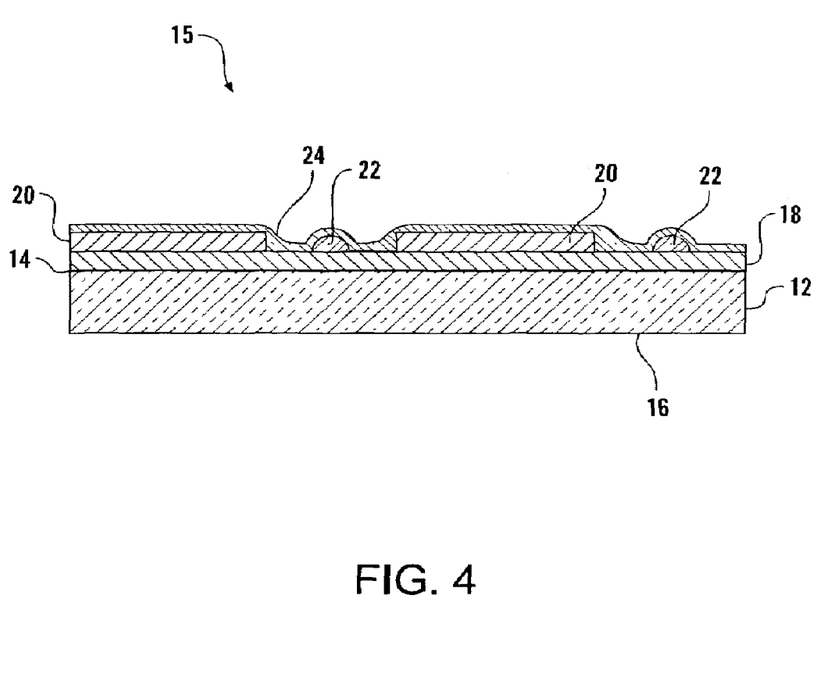
FIG. 4 is an enlarged cross-sectional view illustrating yet another modification of the embodiment shown in FIG. 1.
Figure 4A:
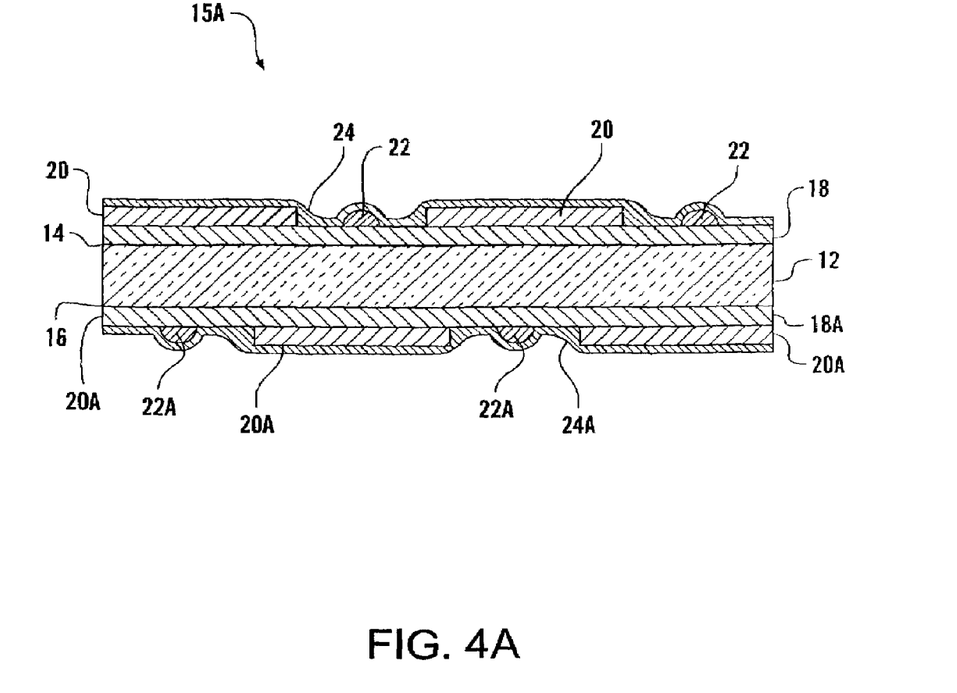
FIG. 4A is an enlarged cross-sectional view of the printed article of FIG. 4 with printing on both the top and bottom surfaces of the printed article.

FIGS. 2, 2A, 3, 3A, 4 and 4A show variations or modifications 11, 11A, 13, 13A, 15 and 15A of the first embodiment as shown in FIGS. 1 and 1A. In particular, as shown in FIG. 2 and 2A, variations 11 and 11A include a graphic design or image 20, 20A printed on selected portions of a reflective layer 18, 18A with a textured pattern 23, 23A of lines 22, 22A printed on both the reflective layer 18, 18A and graphic image 20, 20A. A transparent glossy layer 24 is applied as the topmost layer. In FIGS. 3 and 3A, variations 13 and 13A include a graphic design or image 20, 20A printed on selected portions of a reflective layer 18, 18A with a textured pattern 23, 23A of lines 22, 22A printed only on the graphic image 20, 20A. And as shown in FIGS. 4 and 4A, variations 15 and 15A includes a graphic design or image 20, 20A printed on selected portions of a reflective layer 18, 18A with a textured pattern 23, 23A of lines 22, 22A printed only on the reflective layer 18, 18A.

Figure 5:
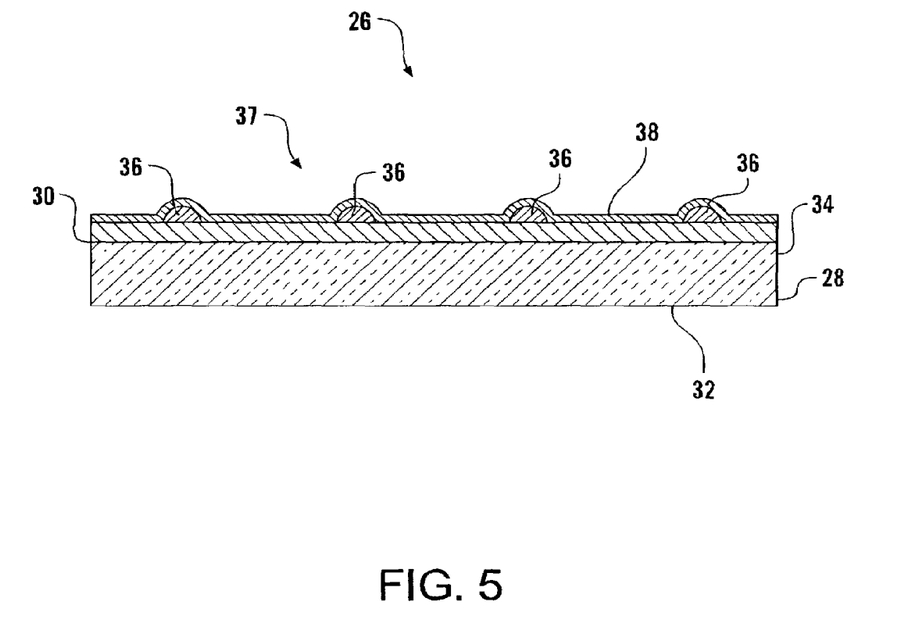
FIG. 5 is an enlarged cross-sectional view of another embodiment of a printed article produced in accordance with the present invention.

FIG. 5 illustrates an enlarged cross sectional view of a second embodiment of a printed article 26 produced in accordance with the present invention. The difference between this embodiment and the first embodiment is that this embodiment does not include a reflective layer printed on the surface of the substrate.

The printed article 26 of the second embodiment includes a substrate 28 having a top surface 30 and a bottom surface 32. A graphic design or image 34 is printed over all or a portion of the top surface 30 of the substrate 28. The graphic design or image 34 may comprise a plurality of ink layers in order to provide the desired design. A preferred method of forming the graphic image 34 is through a four-color offset printing process where a base layer is printed and a four-color image is printed over the base layer. The graphic image 34 may be printed with opaque ink, semi-transparent ink, translucent ink, or any combination thereof. These inks are preferably curable in response to ultraviolet (UV) light. Other methods of forming the graphic image 34 include silk screening, lithography, flexography, gravure or other known printing methods.

A textured pattern of lines 36 is printed over the graphic design or image 34. The textured pattern of lines 36 includes a plurality of convex ridges or curved lines of transparent ink. The textured pattern of lines is preferably printed over all or a portion of the graphic design or image 34. The textured pattern of lines 36 creates an illusion of depth, texture and three-dimensionality in the printed article 26.

A textured pattern 37 is printed over and/or around the graphic design or image 34. The textured pattern 37 includes a plurality of parallel convex rounded ridges or lines 36 of transparent ink printed over and/or around the graphic design or image 34. In the preferred embodiment, the height and thickness of the lines is approximately 0.5 mils to 2 mils. However, the thickness, height and spacing of the lines may vary depending upon the particular application and desired visual effect. The textured pattern 37 can be formed over the entire surface of the image 34 or over only a portion thereof. The textured pattern 37 of lines 36 is preferably formed from a transparent ink, such as Nasdar 3527 or the like, printed on top of the graphic design or image 34 by a printing method such as silk screening, lithography, flexography, offset printing, gravure, coating or other known printing method. The transparent ink has rheological properties such that when it is applied, it flows into a semi-cylindrical or other type of convex shape when viewed in cross-section. This transparent ink is also preferably a UV curable ink. The transparent ink may also include flakes of glitter, pearls, or other materials to produce a "glittery" effect.

The textured pattern 37 gives the appearance of a raised or embossed effect, which simulates depth and three-dimensionality. The semi-cylindrically shaped raised ridges or lines 36 bend and reflect light incident on the printed article 26 producing the visual illusion of depth, texture and three-dimensionality in the printed article as it is viewed from different angles. Light incident on the printed article 26 is reflected off the surface of the substrate 28 back through the graphic design or image 34 and the textured pattern 37 to create a unique visual effect.

A transparent glossy layer 38 is printed over the textured pattern 37 of lines 36 and the graphic design or image 34. The transparent glossy layer 38 must be thin enough not to diminish the glossy and reflective properties of the textured pattern 27. The glossy layer 38 is preferably formed of clear polyester by thermal lamination or by printing or coating with a clear plastic or ink. The glossy layer 38 can also be formed of a pressure sensitive sheet using cold lamination. The transparent glossy layer 38 provides a uniform glossy appearance of the textured pattern 37 and gives the printed article 26 a shiny or glossy appearance.

Figure 5A:
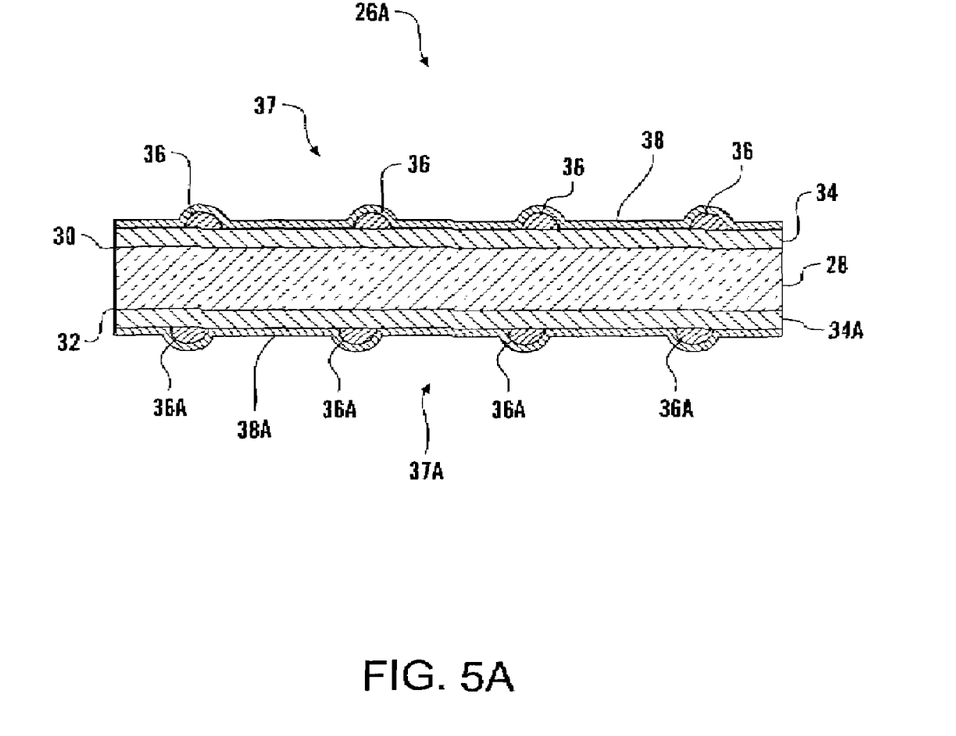
FIG. 5A is an enlarged cross-sectional view of the embodiment of FIG. 5 with printing on both the top and bottom surfaces of the printed article.

FIG. 5A illustrates the printed article 26 of FIG. 5 with printing on both the top 30 and bottom 32 surfaces of the substrate 28. The printed article 26A of FIG. 5A includes a second graphic design or image 34A printed on the bottom surface 32 of the substrate 28, a second textured pattern 37A of lines 36A printed on the second graphic design or image 34A, and a second glossy layer of transparent ink 38A printed on the second textured pattern 37A of lines 36A and the second graphic design or image 34A.

FIG. 6 illustrates an example of a sports trading card 40 manufactured in accordance with the present invention. The card 40 includes the image of a football player 42 printed over a reflective layer covering the top surface of the card. Printed on and around the image 42 is a plurality of textured pattern of lines 44. The textured pattern of lines 44 are produced from transparent ink to create depth and three-dimensionality in the printed image and an overall shiny or glossy textured appearance of the printed article.

While the invention has been described with reference to preferred embodiments, those skilled in the art will appreciate that certain substitutions, alterations, and omissions may be made without departing from the spirit of the invention. Accordingly, the foregoing description is meant to be exemplary only and should not limit the scope of the invention set forth in the following claims.

What is claimed is:

1. A printed article comprising:
a substrate having a top surface;
a reflective layer formed over the top surface of the substrate;
a graphic image formed over the reflective layer;
a transparent textured pattern formed over the graphic image; and
a transparent glossy layer formed over the textured pattern, which is formed over the graphic image.

2. The printed article of claim 1 wherein the graphic image is formed over only a portion of the reflective layer.

3. The printed article of claim 1 wherein the textured pattern is formed over only a portion of the graphic image and the reflective layer.

4. The printed article of claim 1 wherein the graphic image is formed through a four-color offset printing process where a base layer is printed and a four-color image is printed over the base layer.

5. The printed article of claim 1 wherein the transparent textured pattern is formed of transparent ink having rheological properties such that when the ink is printed, the ink flows into raised lines having a substantially semi-cylindrical or convex shape when viewed in cross-section.

6. The printed article of claim 1 wherein the transparent uniform glossy layer includes glitter or pearls.

7. The printed article of claim 1 wherein the substrate includes a bottom surface with a second reflective layer formed on the bottom surface of the substrate, a second graphic image formed on the second reflective layer, a second transparent textured pattern formed on the second graphic image, and a second transparent glossy layer formed on the second textured pattern, which is formed over the second graphic image.

8. A printed article comprising:
a substrate having a top surface;

a reflective layer formed over the top surface of the substrate;

a graphic image formed over the reflective layer through a four-color offset printing process where a base layer is printed and a four-color image is printed over the base layer;

a transparent textured pattern formed over the graphic image; and a transparent glossy layer formed over the textured pattern, which is formed over the graphic image.

9. The printed article of claim 8 wherein the graphic image is formed over only a portion of the reflective layer.

10. The printed article of claim 8 wherein the textured pattern is formed over only a portion of the graphic image and the reflective layer.

11. The printed article of claim 8 wherein the transparent textured pattern is formed of transparent ink having rheological properties such that when the ink is printed, the ink flows into raised lines having a substantially semi-cylindrical or convex shape when viewed in cross-section.

12. The printed article of claim 8 wherein the substrate includes a bottom surface with a second reflective layer formed on the bottom surface of the substrate, a second graphic image formed on the second reflective layer, a second transparent textured pattern formed on the second graphic image, and a second transparent glossy layer formed on the second textured pattern, which is formed over the second graphic image.

13. A method of forming a printed article, the method comprising the steps of:

providing a substrate having a top surface;

forming a reflective layer over the top surface of the substrate;

forming a graphic image over the reflective layer;

forming a transparent textured pattern over the graphic image; and forming a transparent glossy layer over the textured pattern, which is formed over the the graphic image.

14. The method of claim 13 wherein the reflective layer is formed over only a portion of the top surface of the substrate.

15. The method of claim 13 wherein the graphic image is formed over only a portion of the reflective layer.

16. The method of claim 13 wherein the textured pattern is formed over only a portion of the graphic image and only a portion of the reflective layer.

17. The method of claim 13 wherein the graphic image is formed through a four-color offset printing process where a base layer is printed and a four-color image is printed over the base layer.

18. The method of claim 13 wherein the transparent textured pattern is formed of transparent ink having rheological properties such that when the ink is printed, the ink flows into raised lines having a substantially semi-cylindrical or convex shape when viewed in cross-section.

19. The method of claim 13 wherein the substrate includes a bottom surface with a second reflective layer formed on the bottom surface of the substrate, a second graphic image formed on the second reflective layer, a second transparent textured pattern formed on the second graphic image, and a second transparent glossy layer formed on the second textured pattern, which is formed over the second graphic image.

20. A printed article comprising:

a substrate having a top surface;

a graphic image formed over the top surface of the substrate through a four-color offset printing process where a base layer is printed and a four-color image is printed over the base layer;

a transparent textured pattern formed over the graphic image; and a transparent glossy layer formed over the textured pattern, which is formed over the graphic image.

\* \* \* \* \*